United States Patent
Schmidt

(10) Patent No.: US 9,499,413 B2
(45) Date of Patent: Nov. 22, 2016

(54) EVAPORATOR ARRAY FOR A WATER TREATMENT SYSTEM

(71) Applicant: I.D.E. TECHNOLOGIES LTD., Kadima (IL)

(72) Inventor: Yaniv Schmidt, Hod Hasharon (IL)

(73) Assignee: I.D.E. TECHNOLOGIES LTD., Kadima (IL)

( * ) Notice: Subject to any disclaimer, the term of this patent is extended or adjusted under 35 U.S.C. 154(b) by 0 days.

(21) Appl. No.: 14/763,821

(22) PCT Filed: Jan. 21, 2014

(86) PCT No.: PCT/IB2014/058430
§ 371 (c)(1),
(2) Date: Jul. 27, 2015

(87) PCT Pub. No.: WO2014/115076
PCT Pub. Date: Jul. 31, 2014

(65) Prior Publication Data
US 2015/0360969 A1    Dec. 17, 2015

(30) Foreign Application Priority Data

Jan. 27, 2013  (GB) .................................. 1301399.0

(51) Int. Cl.
*C02F 1/04*    (2006.01)
*B01D 1/00*    (2006.01)
(Continued)

(52) U.S. Cl.
CPC ............... *C02F 1/042* (2013.01); *B01D 1/007* (2013.01); *B01D 1/0082* (2013.01); *B01D 1/0088* (2013.01); *C02F 1/043* (2013.01);
(Continued)

(58) Field of Classification Search
CPC .......... C02F 1/04; C02F 1/042; C02F 1/043; C02F 1/048; B01D 1/007; B01D 1/0088; B01D 1/26; E21B 43/24
See application file for complete search history.

(56) References Cited

U.S. PATENT DOCUMENTS 3,248,305 A    4/1966  Williamson
3,401,094 A    9/1968  Lindsay, Jr.
(Continued)

FOREIGN PATENT DOCUMENTS

JP    2011072973    4/2011
WO    WO2004035479    4/2004
(Continued)

OTHER PUBLICATIONS

Search and Examination Report dated Mar. 28, 2013 which issued in application GB1301399.0.

*Primary Examiner* — Bobby Ramdhanie
*Assistant Examiner* — Jonathan Miller
(74) *Attorney, Agent, or Firm* — Symbus Law Group LLC; Clifford D. Hyra

(57) ABSTRACT

An evaporator array for a water treatment system, the evaporator array comprising a produced water feed and a first evaporator to receive produced water from the produced water feed, a makeup water feed and a second evaporator to receive makeup water from the makeup water feed, an output feed to receive distillate from the first evaporator and the second evaporator, and a blowdown feed to receive blowdown from the first evaporator and the second evaporator, wherein the first evaporator and the second evaporator each have a working pH, the working pH of the first evaporator being higher than that of the second evaporator.

12 Claims, 4 Drawing Sheets

(51) Int. Cl.
*E21B 43/24* (2006.01)
*C02F 101/32* (2006.01)
*C02F 103/08* (2006.01)
*C02F 103/10* (2006.01)
*E21B 43/34* (2006.01)

(52) U.S. Cl.
CPC ............... *C02F 1/048* (2013.01); *E21B 43/24* (2013.01); *C02F 2101/32* (2013.01); *C02F 2103/08* (2013.01); *C02F 2103/10* (2013.01); *C02F 2209/06* (2013.01); *C02F 2303/22* (2013.01); *E21B 43/34* (2013.01)

(56) References Cited

U.S. PATENT DOCUMENTS

| | | | | |
|---|---|---|---|---|
| 3,839,160 A * | 10/1974 | Izumi | ...................... | B01D 3/065 159/17.3 |
| 4,985,122 A | 1/1991 | Spencer | | |
| 6,536,523 B1 * | 3/2003 | Kresnyak | ............. | B01D 1/0047 166/266 |
| 7,251,944 B2 * | 8/2007 | Holtzapple | .......... | B01D 1/0058 62/333 |
| 7,799,178 B2 * | 9/2010 | Eddington | ............... | B01D 1/26 159/13.2 |
| 7,905,283 B2 * | 3/2011 | Minnich | ................. | E21B 43/24 166/266 |
| 7,922,874 B2 * | 4/2011 | Ophir | ....................... | B01D 1/26 159/17.1 |
| 8,016,041 B2 * | 9/2011 | Kerfoot | ..................... | C02F 9/00 166/266 |
| 8,047,287 B2 * | 11/2011 | Minnich | ................ | B01D 17/02 166/266 |
| 8,097,128 B1 * | 1/2012 | Sherry | .................... | B05B 1/308 202/177 |
| 2008/0196894 A1 * | 8/2008 | Minnich | ................ | B01D 1/26 166/272.3 |
| 2010/0038081 A1 | 2/2010 | Gamache et al. | | |
| 2010/0089740 A1 * | 4/2010 | Vuong | .................... | C02F 1/042 203/10 |
| 2010/0224364 A1 * | 9/2010 | Heins | ........................ | C02F 1/04 166/267 |
| 2012/0193213 A1 | 8/2012 | James | | |

FOREIGN PATENT DOCUMENTS

| | | |
|---|---|---|
| WO | WO2009029653 | 3/2009 |
| WO | WO2011017526 | 2/2011 |

* cited by examiner

EVAPORATOR ARRAY FOR A WATER TREATMENT SYSTEM

TECHNICAL FIELD

The present invention relates to an evaporator array for a water treatment system, a method of treating water, an oil production system including an evaporator array and a desalination plant including an evaporator array.

BACKGROUND OF THE INVENTION

In oil production, it is common for the extracted oil to contain a large proportion of water which is also present in the reservoir. In addition, some oil production techniques include injecting steam into the oil reservoir to permit or enhance recovery of oil from the reservoir. After the oil has been separated from the water, the remaining water is still contaminated. Advantageously, in oil injection methods the contaminated water is treated and then recycled to a steam generator for use in subsequent oil extraction. This of course reduces the amount of water needed for the extraction process.

Even though such water recycling can be extremely efficient, some additional water is required in the process to make up for losses. This is referred to as makeup water. Conventionally, this makeup water is fresh water with relatively low salinity and hardness.

In some circumstances, it may be desirable or even legally required to use brackish water to provide at least a part of the makeup water. Brackish water has a high salinity and hardness. In known water recycling plants, the water treatment is carried out using an evaporator with a relatively high pH, to maintain silica in solution to reduce scaling. Introducing brackish water with high salinity and alkalinity into the high pH environment causes problems with substantial deposition within the evaporator, causing scaling, requiring periodic shutdown and cleaning to maintain the efficiency of the evaporator.

It is known to deal with this problem by using a pre-treatment step including a cold lime softening (CLS) stage to reduce the hardness of the brackish makeup water. This is, however, unsatisfactory in that the hardness levels are still high after pre-treatment, additional equipment, chemicals and energy are required to operate the system and additional sludge is generated which requires safe disposal.

SUMMARY OF INVENTION

According to a first embodiment of the invention there is provided an evaporator array for a water treatment system, the evaporator array comprising a produced water feed and a first evaporator to receive produced water from the produced water feed, a makeup water feed and a second evaporator to receive makeup water from the makeup water feed, an output feed to receive distillate from the first evaporator and the second evaporator, and a blowdown feed to receive blowdown from the first evaporator and the second evaporator, wherein the first evaporator and the second evaporator each have a working pH, the working pH of the first evaporator being higher than that of the second evaporator.

The evaporator array may comprise a plurality of first evaporators, each of the first evaporators receiving produced water from the produced water feed.

The makeup water feed may supply at least one of brackish makeup water and fresh makeup water.

The makeup water feed may further supply blowdown water from a steam generator.

The evaporator array may further comprising a crystallizer to receive blowdown from the first and second evaporators and produce crystallizer distillate and crystallizer blowdown and crystallized salt.

At least part of the crystallizer distillate may be supplied to the second evaporator.

The working pH of the second evaporator may be less than about 5 and may preferably be in the range pH 2 to 4.

The working pH of the first evaporator may be greater than about 7.5 and may preferably be in the range pH 11 to 12.

The first evaporator may be connectable to the makeup water feed and the second evaporator may be connectable to the produced water feed to permit the operation of the first and second evaporator to be switched.

The second evaporator may have a first effect and a second effect, a first spray nozzle array to provide an acid treatment having a first pH to the first effect and a second spray nozzle array to provide an acid treatment having a second lower pH to the second effect.

According to a second aspect of the invention there is provided an oil production apparatus, the oil production apparatus comprising a steam generator, an oil separation unit, and an evaporator array according to the first aspect of the invention, wherein the oil separation unit is connected to the evaporator array to provide produced water to the evaporation assembly, and the evaporator array is connected to the steam generator to supply distillate to the steam generator.

The oil production apparatus may further comprise a treatment unit to treat the produced water and supply treated produced water to the evaporator array.

According to a further aspect of the invention there is provided a desalination plant comprising an evaporator array according to the first aspect of the invention.

According to a further aspect of the invention, there is provided a method of treating water by evaporation, comprising the steps of supplying produced water to a first evaporator, supplying makeup water to a second evaporator, controlling the first working pH of the first evaporator and the second working pH of the second evaporator such that the first pH is higher than the second pH purifying the produced water at the first evaporator, and supplying distillate to an output distillate stream and blowdown to a blowdown stream, and purifying the makeup water at the second evaporator, and supplying distillate to the output distillate stream and blowdown to the blowdown stream.

The method may comprise supplying produced water to a plurality of first evaporators.

The method may comprise supplying makeup water comprising at least one of brackish makeup water and fresh makeup water.

The method may comprise supplying makeup water comprising blowdown water from a steam generator.

The method may further comprise supplying blowdown from the blowdown stream to a crystallizer and producing crystallizer distillate and crystallizer blowdown.

At least part of the crystallizer distillate may be supplied to the second evaporator.

The working pH of the second evaporator may be less than about 5 and preferably may be in the range pH 2 to 4.

The working pH of the first evaporator may be greater than about 7.5 and preferably may be in the range pH 11 to 12.

The method may comprise supplying makeup water to the first evaporator and produced water to the second to switch the operation of the first and second evaporators.

BRIEF DESCRIPTION OF THE DRAWINGS

Embodiments of the invention will now be described by way of example only with reference to the accompanying drawings wherein.

DETAILED DESCRIPTION

Figure 1:
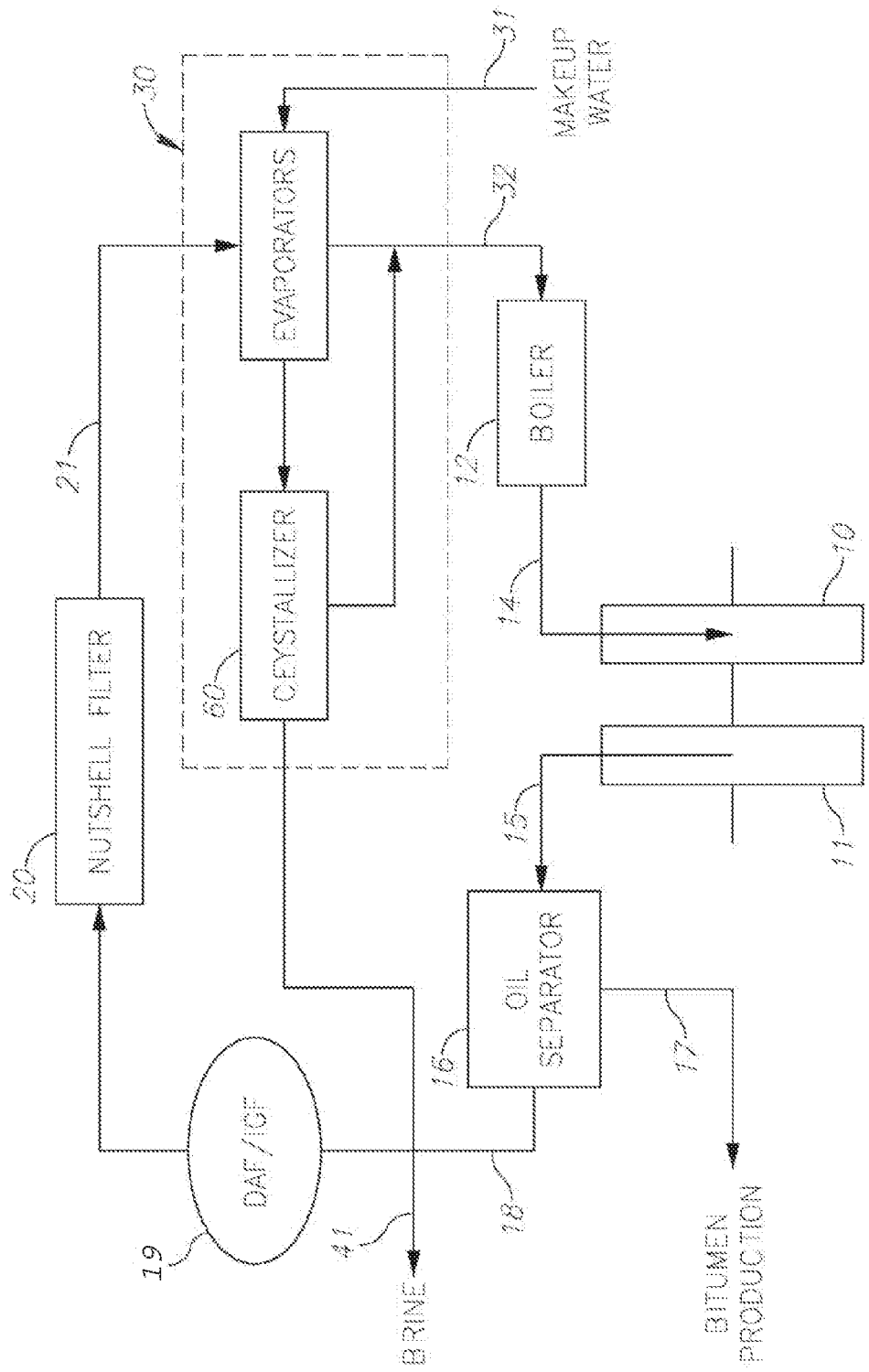
FIG. 1 is a high-level schematic block diagram illustrating an example oil production system.

Prior to setting forth the detailed description, it may be helpful to set forth definitions of certain terms that will be used hereinafter.

The term "produced water" as used herein in this application refers to water produced together with extracted oil or gas and also to water produced for injection as steam or hot water into an oil reservoir to enhance its extraction.

The term "distillate" as used herein in this application refers to steam production and injection or distillate water. Distillate water has to have a high quality, and not be too contaminated. This can be achieved by water evaporation and condensation.

The term "oil contamination" as used herein in this application refers to small quantities of oil, as well as small quantities of polymers and minerals which are also water contaminants. Contaminants originate either from the reservoir itself or from various additives that are used in the extraction process.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 2:
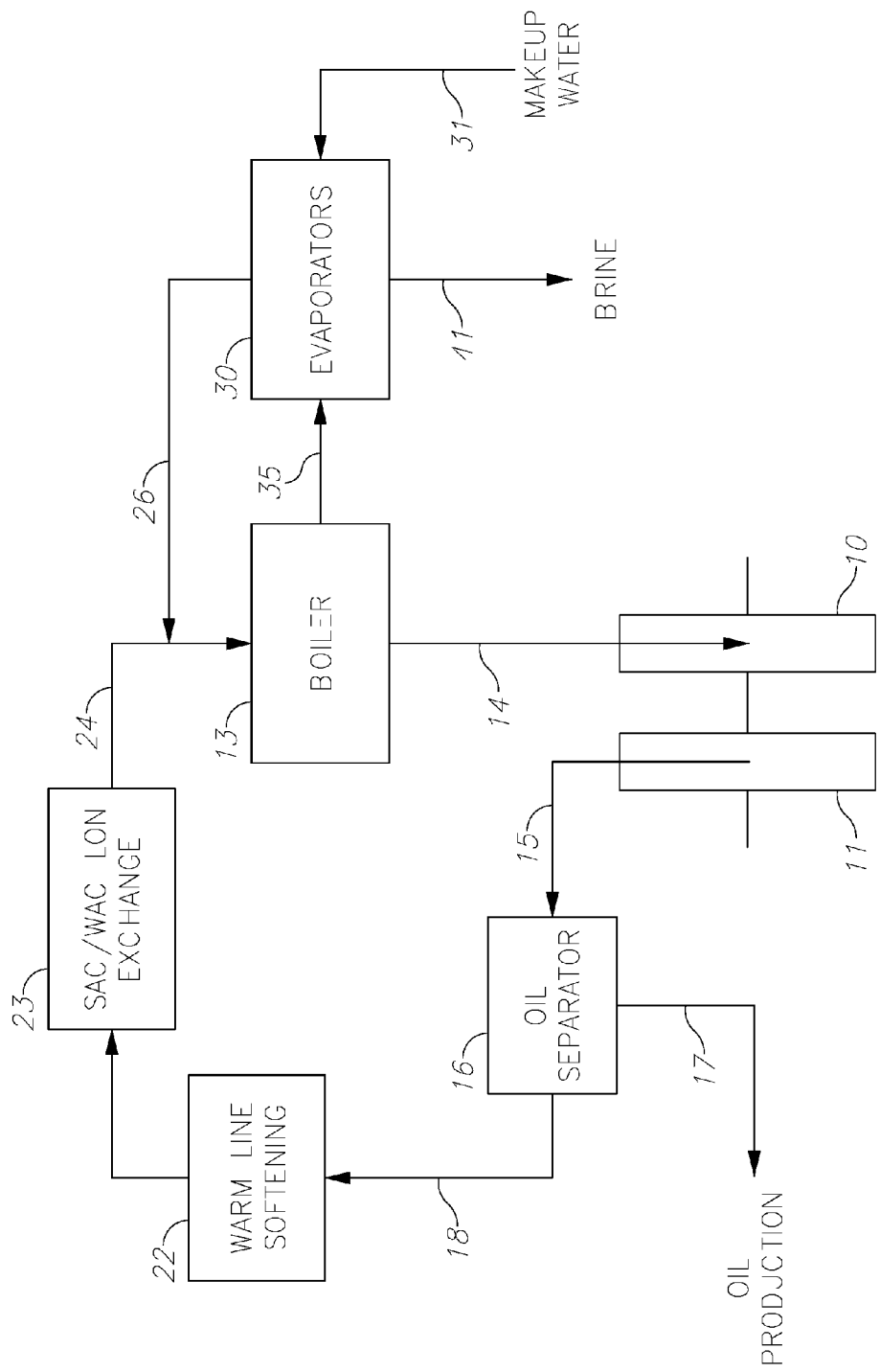
FIG. 2 is a high-level schematic block diagram illustrating a further example oil production system.

FIGS. 1 and 2 each show an example of a steam assisted gravity drainage ("SAGD") system used in oil production. In each example an injection well is shown diagrammatically at 10 and a production well at 11. Alternatively, the same well can be used for injection and production. Steam is generated at a suitable generator, for example a package boiler as shown at 12 in FIG. 1 or a once-through-type steam generator ("OTSG") as shown at 13 FIG. 2. The steam is injected into well 10 as shown by arrow 14. Returned oil and water 15 from the well 11 or a plurality of wells 11 is collected and passed to an oil separation unit 16. The oil separation unit 16 may operate as desired, for example centrifugally or gravitationally, and generates oil or bitumen as shown at 17 and contaminated produced water as shown at 18. The water 18 is contaminated with oil or other residuals, such residuals may be for example in the range of approximately 500 to 5000 ppm of oil or other contaminants.

In the system of FIG. 1, the produced water 18 is then treated, in this example using a dissolved air flotation apparatus ("DAF") or induced gas floatation apparatus ("IGF") as shown at 19 and a walnut shell filter ("WNSF") 20. The filtered produced water is 21 passed to an evaporator array 30 which is discussed in more detail below. The evaporator array receives makeup water as shown at 31, and supplies the distillate 32 to the boiler 12 as boiler feed water ("BFW"). As discussed below with reference to FIG. 3, the BFW is made up of distillate from a plurality of evaporators 50 and possibly also distillate from a crystallizer 60 which receives the blowdown from the evaporators 50. An output blowdown feed 41 receives concentrated brine from the evaporator array 30 for disposal.

In the system of FIG. 2, the produced water 18 is passed through a warm lime softening apparatus 22 and a strong acid cation ("SAC") or weak acid cation ("WAC") ion exchange apparatus 23. This treatment reduces the amount of silica and hardness in the water. The treated water 24 is passed to the OTSG 13 which produces steam 14. Blow down water 35 from the OTSG 13 is passed to an evaporator array 30, as discussed in more detail below. Distillate from the evaporator array 30 is also returned to the OTSG feed as shown at 26. The evaporator array 30 also receives makeup water 31 and has an output blowdown feed or stream 41 to pass concentrated brine for disposal.

Figure 3:
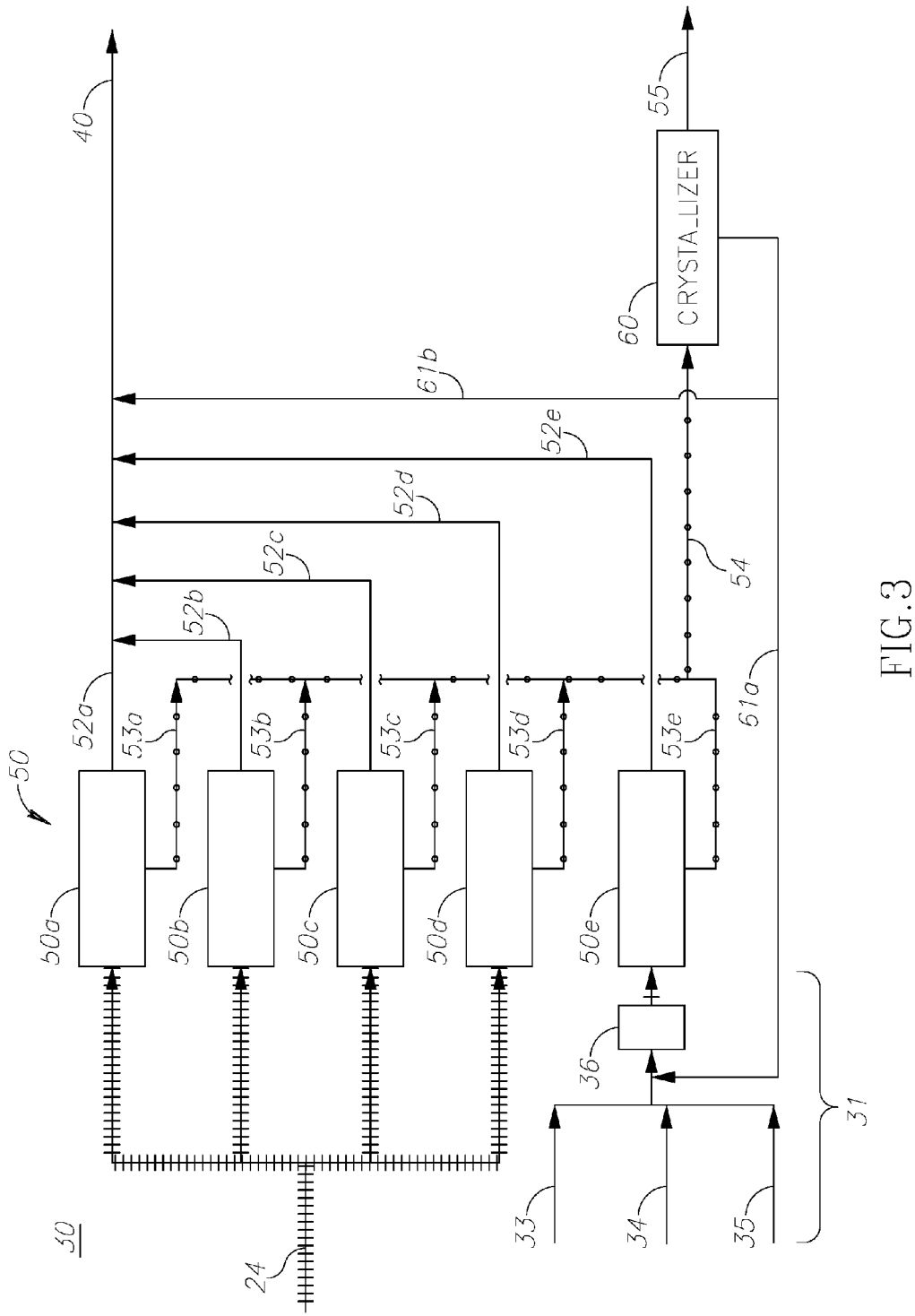
FIG. 3 is a high-level schematic block diagram illustrating an evaporator array embodying the present invention.
Figure 4:
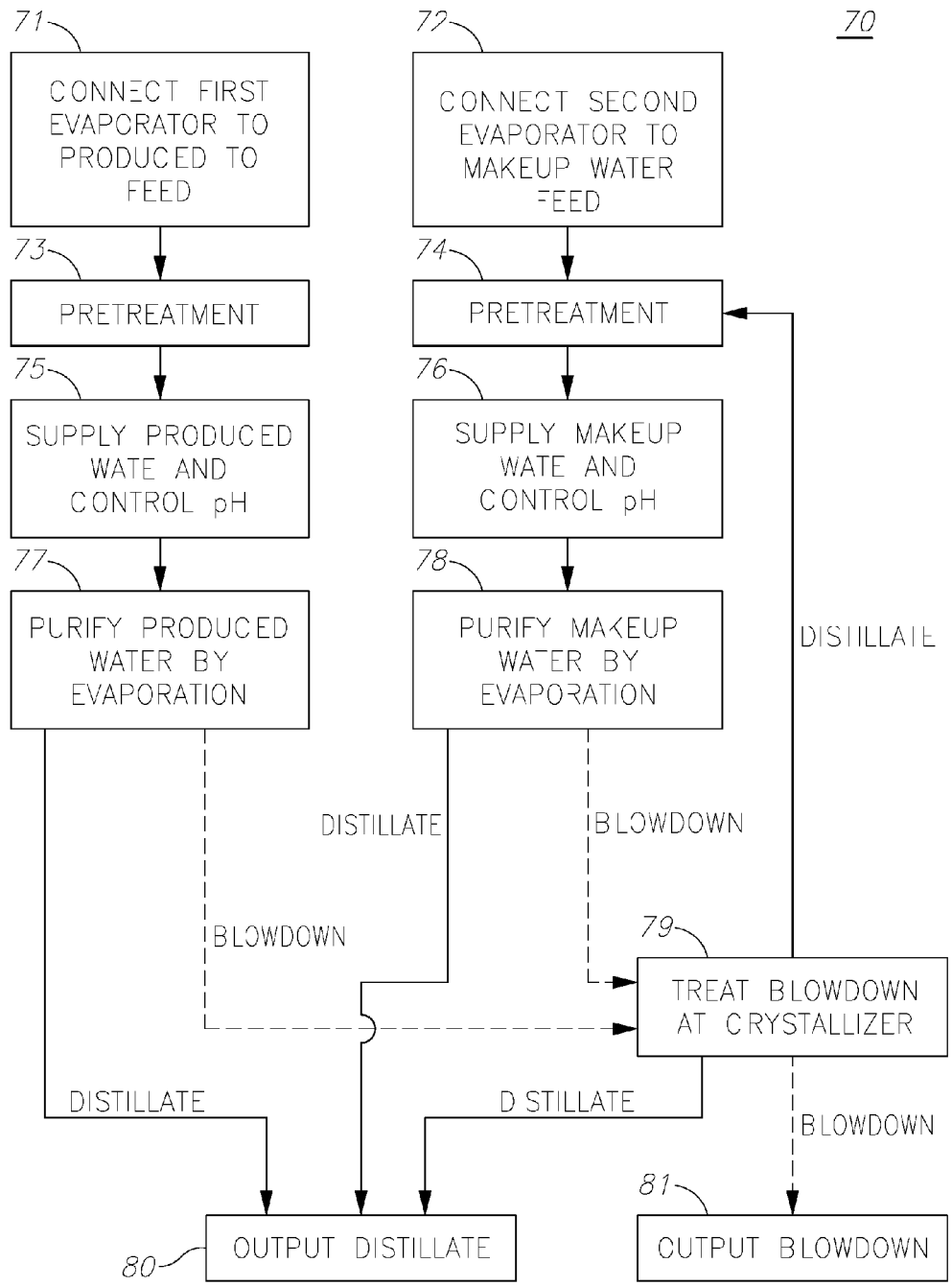
FIG. 4 is a flow chart illustrating a method of purifying water embodying the present invention.

Referring now to FIGS. 3 and 4, the evaporator array 30 is shown in more detail and the method of operation 70 described. The evaporator array comprises a plurality of evaporators generally shown at 50, comprising first evaporators 50a, 50b, 50c, 50d and second evaporator 50e. The first evaporators 50a to 50d are each connected to produced water feed 24 to receive produced water recycled from the oil separation process as shown at step 71 (either filtered produced water 21 as shown in FIG. 1 or boiler blow down water 35 as shown in FIG. 2). Similarly, second evaporator 50e is connected to a makeup water feed generally indicated at 31, as shown at step 72. The makeup water feed 31 is connected to receive water from one or more of a brackish makeup water feed 33, a fresh water makeup feed 34, and, in the system of FIG. 2, a boiler blowdown recovery feed 35. The produced water feed 24 may be pretreated as shown at step 73, for example at as shown in FIGS. 1 and 2 or additionally at a further treatment unit (not shown). The makeup water feed may be passed through a pretreatment unit generally shown at 36 to allow the makeup water to be treated at step 74 as needed, for example by adding an acid such as HCl to lower the pH of the makeup water.

Although pretreatment units are referred to above, it will be apparent that acid or base chemicals may be introduced directly into the evaporators as needed, for example by using the internal spray nozzles conventionally provided, or otherwise. At steps 75 and 76, produced water and makeup water are supplied to the first evaporators 50a to 50d and the second evaporator 50e respectively. The pH within each evaporator can be controlled accordingly.

In a preferred embodiment, the plurality of evaporators 50 are identical, and the connections to the produced water feed 24 and makeup water feed 31 are such that any one or more of the plurality of evaporators 50 can be connected to act as the second evaporator 50e, and the remaining evaporators connected to the produced water feed 24 to act as first evaporators 50a to 50d. As discussed below, this is advantageous in the operation and maintenance of the evaporator unit 30.

At step 77, the first evaporators 50a to 50d are operated to purify the produced water by evaporation. Each of the first evaporators 50a to 50d has a corresponding output feed 52a, 52b, 52c, 52d which receives distillate from the respective first evaporators 50a to 50d and supplies it to an output distillate feed or stream 40, as shown at step 80. Each of the first evaporators 50a to 50d further has a blowdown feed 53a, 53b, 53c, 53d to receive blowdown from the respective first evaporator and supply it to a combined blowdown feed 54. Similarly, at step 78 the second evaporator 50e is operated to purify the makeup water by evaporation. The second evaporator 5e has a distillate output 52e connected to the output distillate feed 40 as shown as at step 80, and a blowdown feed 53e connected to the combined blowdown feed or stream 54. The output distillate feed 40 is connected to supply distillate to the steam generator 12, 13 as shown at 32 and 26 in FIGS. 1 and 2 respectively.

In the illustrated embodiment, the evaporator array 30 further comprises at least one crystallizer 60 (a single crystallizer in the present example) to receive the combined blowdown feed 54 as shown at step 79. The crystallizer is operable to remove further distillate from the combined blowdown feed 54, to potentially produce crystallized salt or minerals for use or safe disposal and/or produce a more concentrated blowdown output 55 for disposal as shown at step 81. As shown at 61a and 61b, the crystallizer distillate output may be selectively directed to one or both of the makeup water feed 31 and the output distillate feed 40. It will be apparent that the crystallizer may be omitted entirely, in which case the combined blowdown output 54 will be connected to the blowdown output feed 41. Alternatively, the crystallizer 60 may extract all the water from the combined blowdown feed 54, in which case the blowdown output 55 and blowdown output feed 41 may be omitted entirely.

The plurality of evaporators 50 may comprise any type of evaporator, such as a mechanical vapour compression (MVC), a multi effect distillation evaporator (MED) or a forced circulation evaporator (FCE) or plate and frame evaporator, in vertical or horizontal configuration.

The number of evaporators 50 is selected as needed to keep the flow rates through the evaporators balanced to supply and demand of the required volume of water to the plant and minimize scaling and deposition in the evaporator as far as possible. In the present example, the evaporator number is selected such that approximately 80% of the water cycle contains a high level of dissolved silica, and 20% has a low level of dissolved silica but has a relatively high hardness, alkalinity and salinity from the brackish makeup water. Accordingly, four first evaporators and one second evaporators are selected, although any other suitable number of first and second evaporators may be used. In the present example, the four first evaporators 50a to 50d are maintained at a relatively high pH, for example at least pH 7.5 and preferably in the range pH 11-12. The second evaporator 50e is operated at a low pH level, for example at around pH 5, by introducing acid into the evaporator, which additionally cleans scale deposits in the evaporator by separating $CO_2$ from the calcium carbonate deposits). The internal operating temperature of the evaporators 50 is around 95° C.-110° C.

In a particularly advantageous aspect of the invention, it will be apparent that the usual cleaning process required for evaporators is not required. Conventionally, evaporators must be periodically shut down and treated with a very aggressive acid, usually at around 0.5 pH and usually pH less than 1, to remove scale. Instead, by selecting a different one of the plurality of evaporators 50 to act as the second evaporator 50e on a periodic basis, for example every few weeks, each of the plurality of evaporators 50 in turn is working in a low pH environment and goes through an online cleaning mode. A selected one of the first evaporators 50a to 50d is connected to the makeup water feed and the second evaporator 50e is connected to the produced water feed to permit the operation of the first and second evaporators to be switched. This clearly reduces loss of working time to cleaning as the system does not need to be shut down. Scale build-up in the high pH evaporators is in any case reduced since hard water is not introduced into the relatively high pH first evaporators 50a to 50d but is only first introduced and treated in the low pH second evaporator 50e. Another advantage of one aspect of the present invention is a reduction in chemical usage and waste disposal.

When necessary, the plurality of evaporators 50 could require some modification. In particular, filters that capture scale fragments may be required where the scale fragments are not dissolved, and a stronger vacuum system will be needed to accommodate excess levels of $CO_2$ in the second evaporator 50e. The brine concentration, according to one non-limiting example of the present invention, in the blowdown output 53a to 53d from the first evaporators 50a to 50d will be about 4 to 5%, while the brine concentration in the blowdown output 53e from the second evaporator 50e will be substantially higher, for example about 20%. A stronger compressor will be necessary to accommodate the higher vapour pressure generated by more concentrated brine and thus the extra energy needed to compress the vapours. Additionally, where each evaporator has two effects in conventional manner, it may be desirable to treat each effect separately when the evaporator is acting as second evaporator 50e. In operation, the first is hotter than the second, and thus the rate of scale build-up in the first will be slower than in the second. To ensure the two effects are treated effectively but in the same time, it may be desirable to introduce acid with a higher pH, for example about pH 4, into the first effect and with a lower pH, for example about pH 2, into the second effect. Ideally, this may be performed using the existing spray nozzle arrays in each effect of the evaporator, or additional or dedicated spray nozzle arrays may be provided.

An example of the rates of treatment are at full production site which produces 30.000 barrels of oil a day, 15,000 m³ of water should be treated a day. In an example of the embodiment of FIG. 3, the produced water feed is about 13,000 m³ per day. The makeup water supply is made up of about 2,000 m³ a day from the brackish makeup water feed 33, about 400 m³ a day from the fresh water makeup feed 34 and about 300 m³ per day from the steam generator blowdown feed 35. The crystallizer returns about 500 m³ per day. The output of the evaporator array 30 is about 15,550 m³ of water a day and about 150 m³ at the crystallizer blowdown stream.

Further advantages of the embodiment as described are that the system will require less chemical than known CLS or ion-exchanger pre-treatment systems and require no extra waste disposal compared to the extra sludge generated by a CLS pre-treatment system. Certainly, there is no need for the extra equipment associated with a CLS pre-treatment system including a hydrated lime feed system.

Although the evaporator apparatus as described herein has been shown by way of example as being used in a water treatment plant of an oil production system, it will be apparent that the evaporator apparatus may be used in any other circumstances where supplied water feed having different characteristics must be treated. For example, the evaporator array may comprise part of a desalination plant. Other treatment steps or treatment units may be provided as needed.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Furthermore, it is to be understood that the invention can be carried out or practiced in various ways and that the invention can be implemented in embodiments other than the ones outlined in the description above.

The invention is not limited to those diagrams or to the corresponding description. For example, flow need not move through each illustrated box or state, or in exactly the same order as illustrated and described.

Meanings of technical and scientific terms used herein are to be commonly understood as by one of ordinary skill in the art to which the invention belong, unless otherwise defined.

The invention claimed is:

1. An evaporator array for a water treatment system, the evaporator array comprising;
    a produced water feed and a first evaporator to receive produced water from the produced water feed,
    a makeup water feed and a second evaporator to receive makeup water from the makeup water feed,
    an output distillate feed to receive distillate from the first evaporator and the second evaporator, and, a blowdown feed to receive blowdown from the first evaporator and the second evaporator,
    wherein the first evaporator and the second evaporator each have a working pH, the working pH of the first evaporator being higher than that of the second evaporator, and
    wherein the blowdown feed is separate from the produced water feed.

2. An evaporator array according to claim 1 comprising a plurality of first evaporators, each of the first evaporators receiving the produced water from the produced water feed.

3. An evaporator array according to claim 1 wherein the makeup water feed supplies at least one of brackish makeup water and fresh makeup water.

4. An evaporator according to claim 3 wherein the makeup water feed further supplies blowdown water from a steam generator.

5. An evaporator array according to claim 2 wherein the makeup water feed supplies at least one of brackish makeup water and fresh makeup water.

6. An evaporator according to claim 5 wherein the makeup water feed further supplies blowdown water from a steam generator.

7. An evaporator array for a water treatment system, the evaporator array comprising:
    a produced water feed and a first evaporator to receive produced water from the produced water feed;
    a makeup water feed and a second evaporator to receive makeup water from the makeup water feed;
    an output distillate feed to receive distillate from the first evaporator and the second evaporator; and
    a blowdown feed to receive blowdown from the first evaporator and the second evaporator, wherein
    the first evaporator and the second evaporator each have a working pH, the working pH of the first evaporator being higher than that of the second evaporator,
    the output distillate feed receives a first distillate directly from the first evaporator and the output distillate feed receives a second distillate directly from the second evaporator, and
    the blowdown feed receives a first blowdown directly from the first evaporator and the blowdown feed receives a second blowdown directly from the second evaporator.

8. A method of treating water by evaporation, comprising the steps of; supplying produced water to a first evaporator from a produced water feed,
    supplying makeup water to a second evaporator,
    controlling a first working pH of the first evaporator and a second working pH of the second evaporator such that the first pH is higher than the second pH,
    purifying the produced water at the first evaporator, and supplying a first distillate to an output distillate stream and a first blowdown to a blowdown stream, and
    purifying the makeup water at the second evaporator, and supplying a second distillate to the output distillate stream and a second blowdown to the blowdown stream,
    wherein the blowdown stream is separate from the produced water feed.

9. A method according to claim 8 comprising supplying the produced water to a plurality of first evaporators.

10. A method according to claim 8 comprising supplying makeup water comprising at least one of brackish makeup water and fresh makeup water.

11. A method according to 9 further comprising supplying makeup water comprising blowdown water from a steam generator.

12. A method according to claim 9 comprising supplying makeup water comprising at least one of brackish makeup water and fresh makeup water.

* * * * *